(12) United States Patent
Ericsson et al.

(10) Patent No.: US 10,732,804 B2
(45) Date of Patent: Aug. 4, 2020

(54) DEVICE-TO-DEVICE COMMUNICATION IN AN INDUSTRIAL AUTOMATION ENVIRONMENT

(71) Applicant: Rockwell Automation Technologies, Inc., Mayfield Heights, OH (US)

(72) Inventors: Matthew R. Ericsson, Lyndhurst, OH (US); Ashish Anand, Mayfield Heights, OH (US); Michael Ohlsen, Chesterland, OH (US); Kevin Peters, Aurora, OH (US); Milosz Scelina, Chorzow (PL); Kyle Reissner, Hudson, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 323 days.

(21) Appl. No.: 14/723,131

(22) Filed: May 27, 2015

(65) Prior Publication Data
US 2016/0349966 A1 Dec. 1, 2016

(51) Int. Cl.
*G06F 3/0484* (2013.01)
*G06Q 10/10* (2012.01)
*H04L 29/08* (2006.01)

(52) U.S. Cl.
CPC ....... *G06F 3/04842* (2013.01); *G06Q 10/101* (2013.01); *H04L 67/104* (2013.01)

(58) Field of Classification Search
CPC ... H04L 51/04; H04L 51/046; H04L 41/0816; G06Q 10/06
USPC .................................................. 715/751–759
See application file for complete search history.

(56) References Cited

U.S. PATENT DOCUMENTS

| | | | | |
|---|---|---|---|---|
| 6,745,090 B1* | 6/2004 | Malizia, Jr. | ........ | G05B 19/0423 345/418 |
| 7,133,900 B1* | 11/2006 | Szeto | ...................... | H04L 51/04 709/203 |
| 7,539,724 B1* | 5/2009 | Callaghan | .......... | G05B 19/4185 700/9 |
| 2003/0046398 A1* | 3/2003 | Buckley | .................. | H04L 29/06 709/227 |
| 2003/0208545 A1* | 11/2003 | Eaton | ...................... | H04L 29/06 709/206 |
| 2005/0071481 A1* | 3/2005 | Danieli | ................... | A63F 13/12 709/229 |

(Continued)

OTHER PUBLICATIONS

Wikipedia: "Tox (protocol)" Internet Article, May 26, 2015, Retrieved from the Internet: URL:https://en.wikipedia.org/w/index.php?title=Tox_(protocol)&oldid=664111303, retrieved on Jul. 13, 2016.

(Continued)

*Primary Examiner* — Andrew L Tank

(57) ABSTRACT

Techniques to facilitate communication between users in an industrial application associated with an industrial automation environment are disclosed herein. In at least one implementation, a graphical user interface (GUI) associated with the industrial application is displayed on a display system of the computing system. The computing system engages in a peer-to-peer communication session with a remote computing system, wherein the peer-to-peer communication session is displayed within the GUI of the industrial application. Industrial data associated with the industrial application is displayed within the peer-to-peer communication session.

20 Claims, 8 Drawing Sheets

(56) References Cited

U.S. PATENT DOCUMENTS

| | | | |
|---|---|---|---|
| 2009/0089682 A1* | 4/2009 | Baier | G06Q 10/10 |
| | | | 715/751 |
| 2014/0337429 A1 | 11/2014 | Asenjo | |
| 2015/0100892 A1* | 4/2015 | Cronin | G06Q 10/0633 |
| | | | 715/747 |
| 2015/0100893 A1* | 4/2015 | Cronin | G06Q 10/06316 |
| | | | 715/751 |
| 2015/0358203 A1* | 12/2015 | Glenn | H04L 41/0816 |
| | | | 715/740 |
| 2016/0147971 A1* | 5/2016 | Kolowitz | G06F 19/3425 |
| | | | 715/753 |

OTHER PUBLICATIONS

George Coulouris et al., "Distributed Systems: Concepts and Design (5th Edition)," May 7, 2011, Addison-Wesley, ISBN: 978-0-13-214301-1, pp. ToC, Pre, Ch01-Ch04, Ch06, Ch07, Ch09, Ch11, Ch19, Ch21, pp. 177-178.

Bartel Van De Walle et al., "Information Systems for Emergency Management," Dec. 29, 2009, Routledge, ISBN: 978-0-7656-2134-4, pp. 156-164.

Robyn Ness et al., "Sams Teach Yourself Mac OS X Tiger All in One," Jun. 11, 2005, Sams Publishing, ISBN: 978-0-672-32705-6, pp. 322-326.

Ovidiu Vermesan et al., "Internet of Things: Converging Technologies for Smart Environments and Integrated Ecosystems," Jun. 5, 2013, River Publishers, ISBN: 978-87-9298-273-5, pp. 167-174.

Joseph Annuzzi et al., "Advanced Androi Application Development, 4th Edition," In: "Advanced Android Application Development, 4th Edition," Nov. 24, 2014, Addison-Wesley, ISBN: 978-0-13-389238-3, pp. 115-117.

* cited by examiner

DEVICE-TO-DEVICE COMMUNICATION IN AN INDUSTRIAL AUTOMATION ENVIRONMENT

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Techniques to facilitate communication between users in an industrial application associated with an industrial automation environment are disclosed herein. In at least one implementation, a graphical user interface (GUI) associated with the industrial application is displayed on a display system of the computing system. The computing system engages in a peer-to-peer communication session with a remote computing system, wherein the peer-to-peer communication session is displayed within the GUI of the industrial application. Industrial data associated with the industrial application is displayed within the peer-to-peer communication session.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for direct device-to-device communication in industrial automation environments. Most industrial operations typically generate noise and electrical interference that adversely effect wireless communications, resulting in varying levels of connectivity throughout a plant. In addition, many industrial automation environments have not deployed network infrastructure necessary to support plant-wide communications. Because of this lack of networking equipment and the harsh conditions in an industrial setting, communication between individual operators can be difficult. The techniques disclosed herein help to overcome these problems by enabling users to communicate with mobile communication devices, such as smartphones, tablets, laptops, or industrial plant management hardware, without the use of intermediary servers, services, or cloud infrastructure.

In at least one implementation, a graphical user interface (GUI) of an industrial application is displayed on a display system of a computing system. The computing system wirelessly connects to a remote computing system and engages in a peer-to-peer communication session, typically from within the GUI of the industrial application. Industrial data associated with the industrial application may be displayed within the peer-to-peer communication session, enabling the users to discuss the data being displayed as it changes in real time. By enabling direct device-to-device communication between users in an industrial environment within the context of industrial applications, the users are better able to resolve issues and manage industrial operations.

Figure 1:
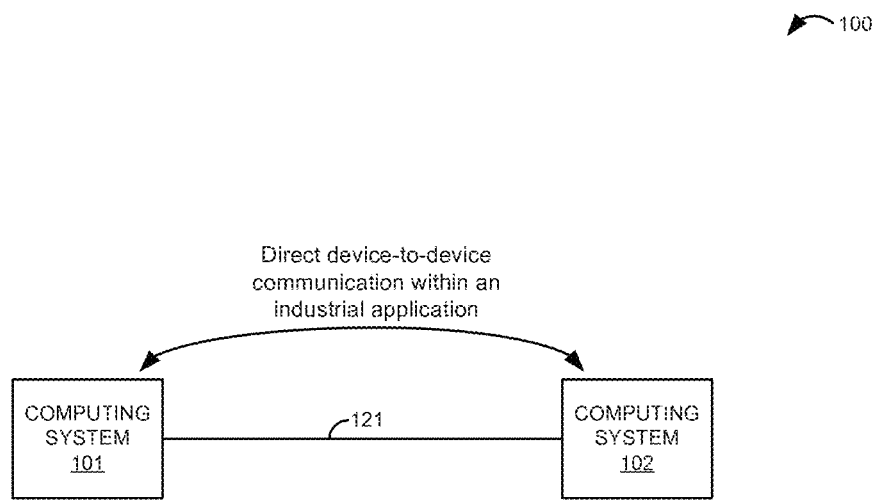
FIG. 1 is a block diagram that illustrates an operation of a communication system in an exemplary implementation.
Figure 2:
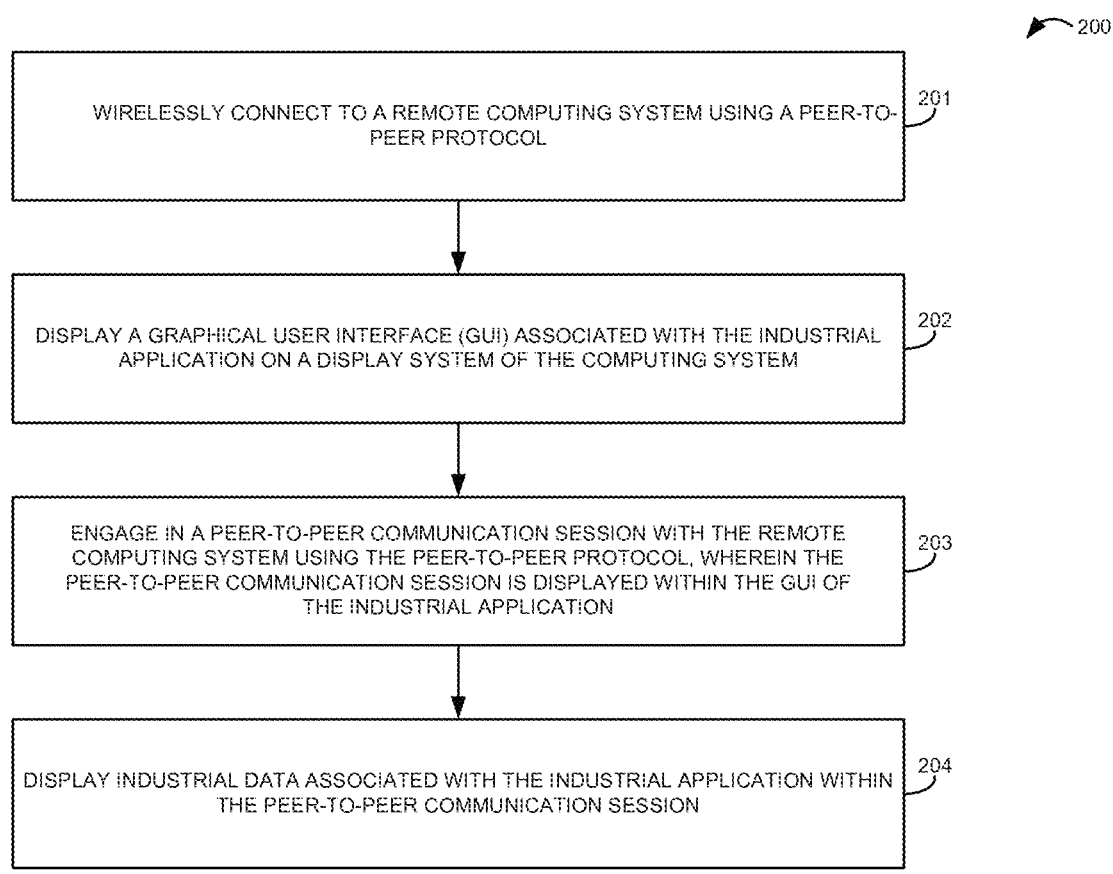
FIG. 2 is a flow diagram that illustrates an operation of a computing system in an exemplary implementation.
Figure 3:
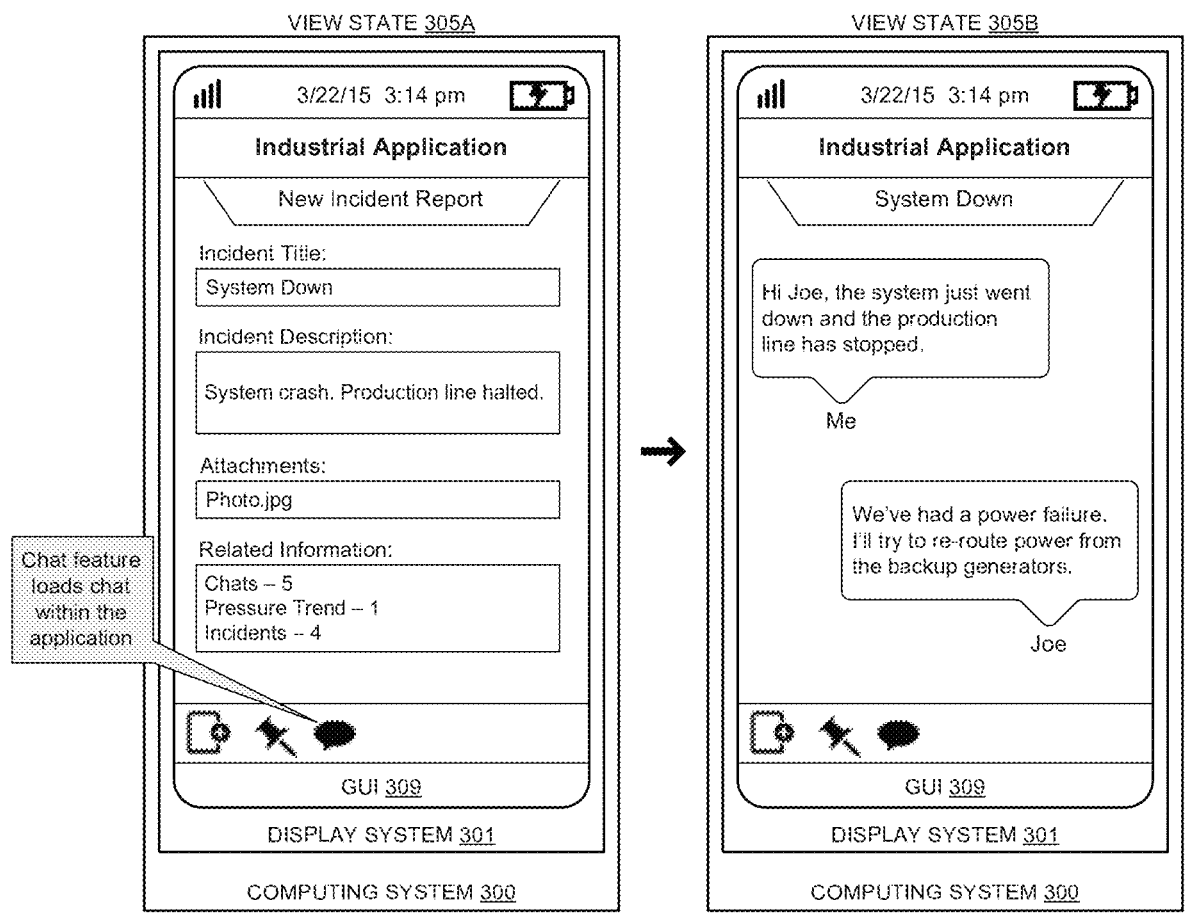
FIG. 3 is a block diagram that illustrates an operational scenario of a computing system in an exemplary implementation.
Figure 4:
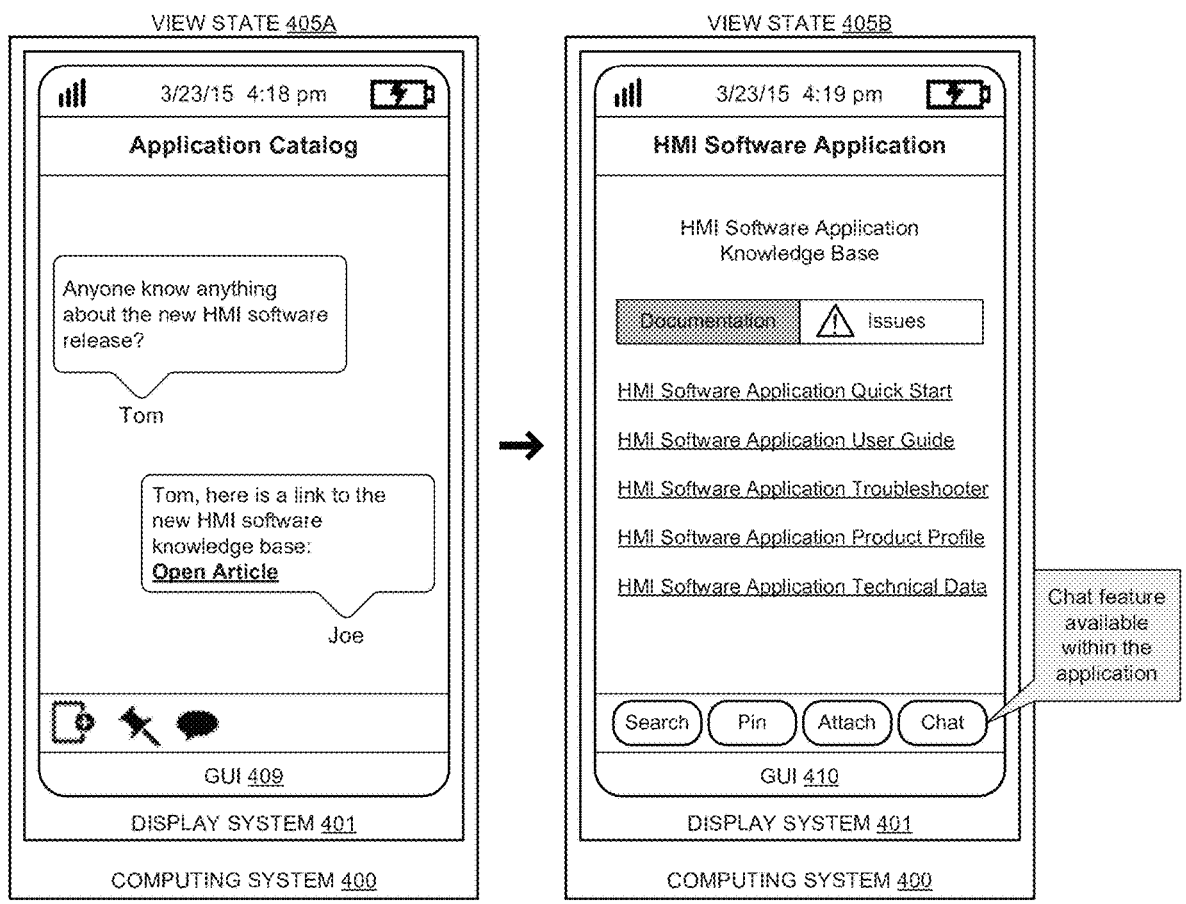
FIG. 4 is a block diagram that illustrates an operational scenario of a computing system in an exemplary implementation.
Figure 5:
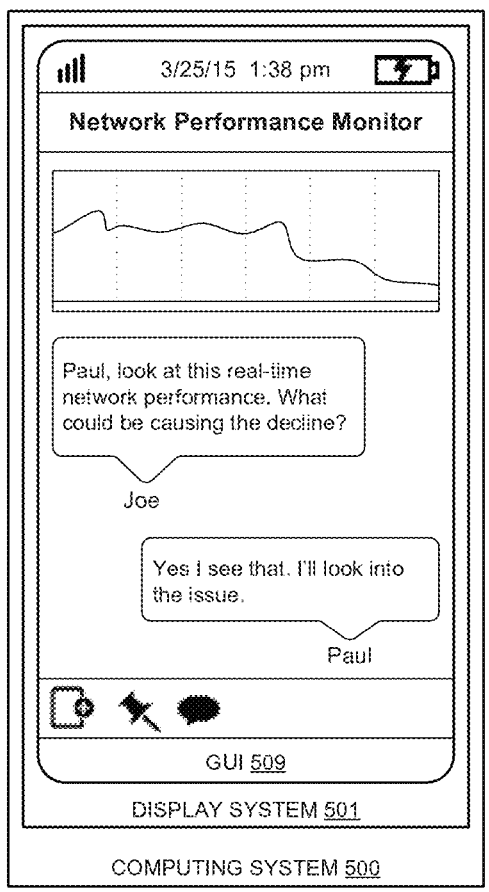
FIG. 5 is a block diagram that illustrates an operational scenario of a computing system in an exemplary implementation.
Figure 6:
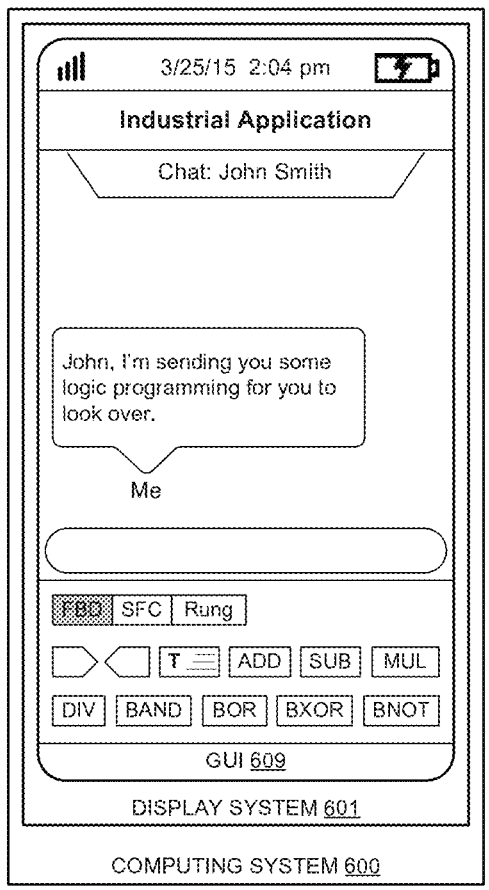
FIG. 6 is a block diagram that illustrates an operational scenario of a computing system in an exemplary implementation.
Figure 7:
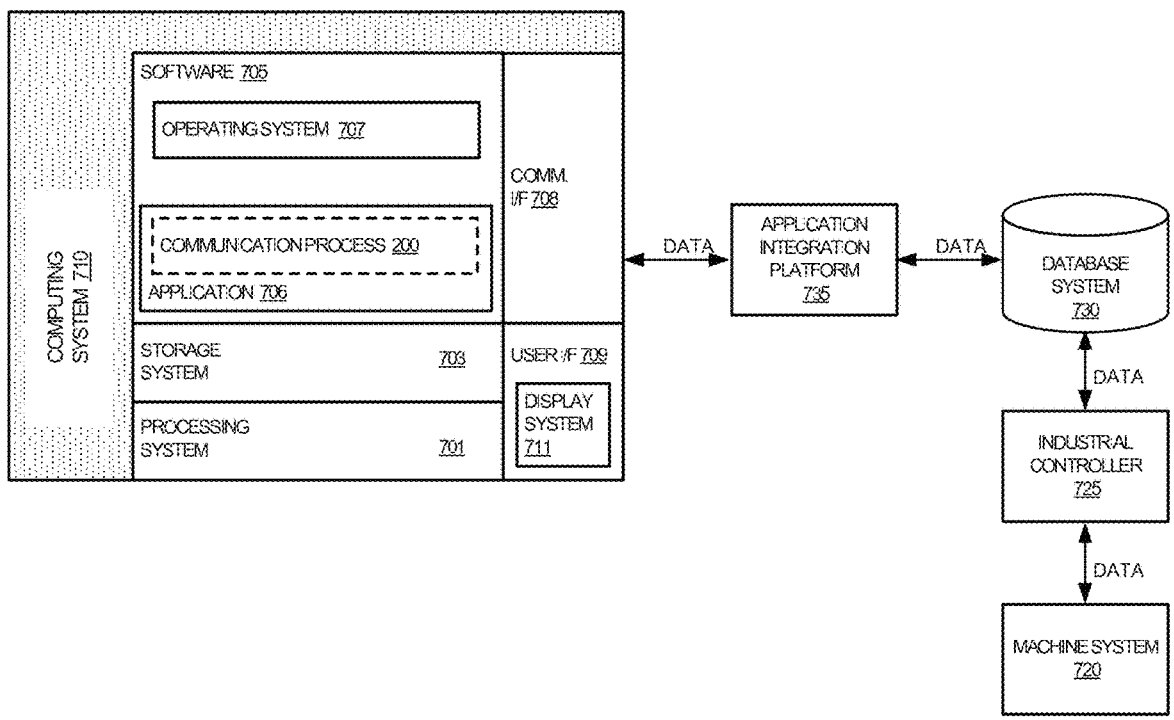
FIG. 7 is a block diagram that illustrates an operational scenario involving a computing system in an industrial automation environment in an exemplary implementation.
Figure 8:
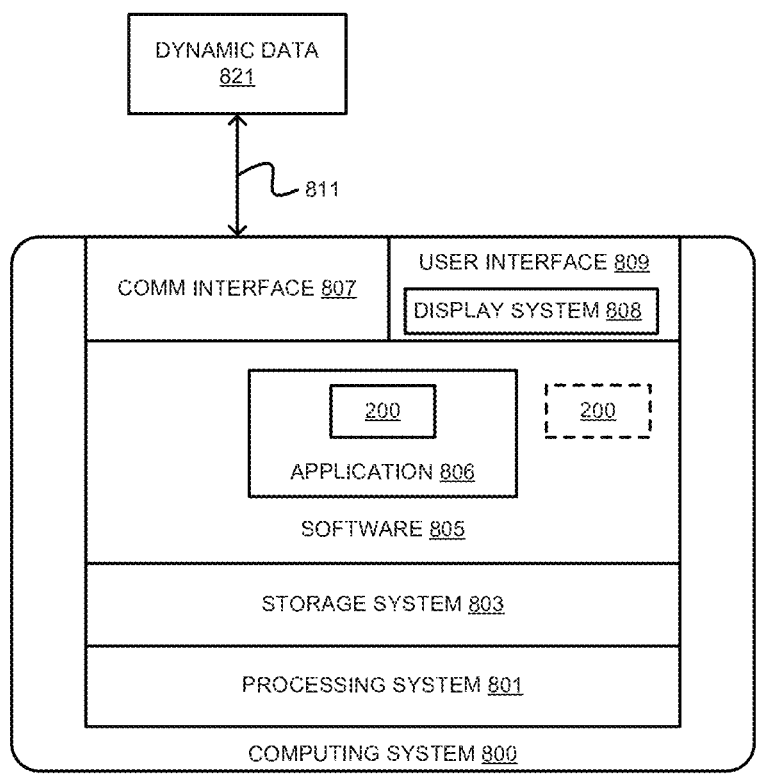
FIG. 8 is a block diagram that illustrates a computing system in an exemplary implementation.

Referring now to the drawings, FIG. 1 illustrates a communication system and an operational scenario in which computing systems engage in direct device-to-device communications. FIG. 2 is a flow diagram that illustrates a communication process that may be performed by a computing system. FIG. 3 illustrates an operational scenario involving a chat session launched within an incident report in an exemplary implementation, while FIG. 4 illustrates an operational scenario of a chat feature available within an industrial application in another exemplary implementation. FIG. 5 illustrates an operational scenario of a chat session and industrial data displayed simultaneously in an exemplary implementation, while FIG. 6 illustrates an operational scenario of a chat session having an industry-specific keyboard in another exemplary implementation. FIG. 7 illustrates an exemplary industrial automation environment that includes a computing system that may be used to execute a communication process, and FIG. 8 illustrates an exemplary computing system that may be used to perform any of the communication processes and operational scenarios described herein.

Turning now to FIG. 1, an operational scenario of communication system 100 is illustrated in an exemplary implementation. Communication system 100 includes computing systems 101 and 102. Computing system 101 and computing system 102 communicate over communication link 121.

An exemplary operation of communication system 100 is illustrated in FIG. 1. In this example, computing systems 101 and 102 establish direct device-to-device communication over communication link 121 without the use of intermediate servers, routers, or other network equipment. For example, computing system 101 and 102 could communicate over communication link 121 using peer-to-peer networking over Bluetooth, Bluetooth low energy, Wi-Fi Direct, near field communication (NFC), and other wireless protocols. In some implementations, computing systems 101 and 102 could be part of a node-based infrastructure in a wireless mesh network.

After establishing a direct connection, the users of computing systems 101 and 102 engage in a communication session within an industrial application. For example, the users could communicate using peer-to-peer chat that is displayed along with other features and functionality of an industrial application. The communication session is typically displayed within the same graphical user interface (GUI) that is associated with the industrial application. In this manner, the users can communicate directly from an industrial application used to monitor and manage industrial operations, without the use of intermediate networking equipment. An exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as communication process 200 herein. The steps of the operation are indicated below parenthetically. The following discussion of operation 200 will proceed with reference to computing systems 101 and 102 of FIG. 1 in order to illustrate its operations, but note that the details provided in FIG. 1 are merely exemplary and not intended to limit the scope of process 200 to the specific implementation of FIG. 1.

Operation 200 may be employed to operate a computing system to facilitate communication between users in an application associated with an industrial automation environment. However, operation 200 could also be employed by a computing system to facilitate user communication for any software application irrespective of its purpose or functionality, including a website or webpages provided by a server for viewing in a web browser, mobile applications for execution on a mobile device, editing and design tools, media players, simulation software, or any other application.

As shown in the operational flow of process 200, computing system 101 wirelessly connects to remote computing system 102 using a peer-to-peer protocol (201). The peer-to-peer protocol could comprise any wireless protocol capable of facilitating direct device-to-device communication between computing systems 101 and 102. For example, computing system 101 and 102 could wirelessly connect using peer-to-peer networking over Bluetooth, Bluetooth low energy, Wi-Fi Direct, near field communication (NFC), and other wireless protocols. It should be understood that computing system 101 wirelessly connecting to remote computing system 102 could be handled by other software components and libraries to establish the connection, such as operating system functions, hardware drivers, and the like. In some implementations, computing systems 101 and 102 could be part of a node-based infrastructure in a wireless mesh network.

A graphical user interface (GUI) associated with an industrial application is displayed on a display system of computing system 101 (202). Typically, when the industrial application is launched, either by the user or an operating system or some other process, the application directs computing system 101 to display the GUI on the display system. The GUI provides the user with an interface to view and interact with graphical content and other data associated with the industrial application that is displayed by computing system 101.

Computing system 101 engages in a peer-to-peer communication session with remote computing system 102, wherein the peer-to-peer communication session is displayed within the GUI of the industrial application (203). The peer-to-peer communication session typically comprises a text-based chat session between the users of computing systems 101 and 102, although alternative forms of communication could also be used, including video, audio, images, and others. The peer-to-peer communication session could comprise any technique of direct communication between computing systems 101 and 102 without the use of additional servers, switches, routers, or other intermediary networking equipment. The peer-to-peer communication session is displayed by computing system 101 within the GUI of the industrial application, and thus is typically, although not necessarily, incorporated as a feature or module within the industrial application itself. Thus, in some implementations, the peer-to-peer communication session is launched from within the industrial application. The peer-to-peer communication session could also be launched from within an incident report associated with the industrial application. In at least one implementation, the peer-to-peer chat session is also displayed within an instance of the industrial application running on remote computing system 102. In some implementations, a user-specific keyboard could also be displayed within the peer-to-peer communication session having characters associated with a user's organizational role in the industrial automation environment.

Computing system 101 displays industrial data associated with the industrial application within the peer-to-peer communication session (204). The industrial data displayed within the communication session could comprise any data for an industrial application associated with the industrial automation environment. In some examples, the industrial data could comprise operational data, machine data, screen graphics data, screen captures, video data, tag data, alarms, drive configurations, key performance indicators (KPIs), charts, trends, and other graphical content, simulation data, or any other data associated with an industrial automation environment, including combinations thereof. In at least one example, the industrial data associated with the industrial application could comprise a live trend displaying current operational data as it is generated. The industrial data is typically displayed in response to a user request, but the data could also be displayed by the industrial application automatically on a scheduled or periodic basis, or in response to alarms and other events to notify the user of potential problems. For example, computing system 101 could display the industrial data associated with the industrial application within the peer-to-peer communication session in response to a user selection of the industrial data for display within the peer-to-peer communication session.

The industrial data may also be displayed within the peer-to-peer communication session on remote computing system 102. For example, to display the industrial data, computing system 101 could be configured to display the industrial data within the peer-to-peer communication session on the display system of computing system 101, and transfer the industrial data to remote computing system 102 for display within the peer-to-peer communication session on remote computing system 102. Remote computing system 102 could also receive the industrial data for display within the peer-to-peer communication session from other network resources. For example, an application server (not shown) typically collects and retrieves the industrial data for the industrial application and transfers the data to computing system 101 and/or 102, but note that the industrial data could be received from various different systems which may be in geographically diverse locations. In some examples, the application server could comprise a system located on-premise and accessible over a local network connection, or running in a cloud-based environment accessed over a wide area network such as the Internet, or any other deployment scheme, including combinations thereof. In at least one implementation, the industrial data displayed within the peer-to-peer communication session could be stored locally within computing system 101 and/or 102. Other system and network architectures are possible and within the scope of this disclosure.

Advantageously, computing systems 101 and 102 can engage in a peer-to-peer communication session within the context of an industrial application. By utilizing direct device-to-device communication, the users of computing systems 101 and 102 are able to communicate even in harsh industrial environments and without intermediate networking components. Displaying the industrial data associated with the industrial application within the peer-to-peer communication session also provides valuable context and interactivity to the conversation, thereby facilitating operations management and troubleshooting. An example of a graphical user interface provided by an application that illustrates one possible implementation of the techniques disclosed herein will now be discussed with respect to FIG. 3.

FIG. 3 is a block diagram that illustrates an operational scenario of computing system 300 in an exemplary implementation. Computing system 300 includes display system 301 which displays graphical user interface (GUI) 309 of an industrial application. In this example, display system 301 comprises a touch screen that displays GUI 309 for the user to interact with and accepts input commands from the user via the user's touches on the surface of the touch screen. In FIG. 3, two different view states are shown displayed on display system 301, labeled 305A and 305B. The different view states show the changes that occur to GUI 309 as the user makes selections and interacts with GUI 309 and its associated application.

In view state 305A, the user has created a new incident report within the industrial application. The incident report relates to a problem or issue with industrial operations. In this case, the user has specified the title of the incident as "System Down" and has entered a description of the incident as "System crash. Production line halted." The user has also included a photo image attachment to the incident report. The "Related Information" section indicates that five chat sessions have commenced related to the incident, there is one related pressure trend, and four related incidents.

At the bottom of GUI 309 on view state 305A, the user is presented with an option to launch a chat session from within the industrial application related to the incident report. In this example, the chat option is provided by the small chat bubble graphical icon appearing on GUI 309, which loads a chat session within the application. The user selects the chat bubble icon, which brings up a chat session as shown in view state 305B.

View state 305B illustrates an exemplary chat session window that is displayed within the context of the incident report in the industrial application. In some implementations, when selecting the chat option, the user is prompted to identify a target user or users for the chat session, and the industrial application would responsively direct computing system 300 to connect directly to the mobile devices of the target users over a peer-to-peer protocol to establish direct device-to-device communication. As illustrated in view state 305B, the title of the incident, "System Down", is displayed at the top of the chat session. The chat session is also displayed within GUI 309 of the industrial application, which beneficially ensures that the context of the incident in the industrial application is not lost, and the user does not need to close the industrial application or load an additional application to engage in the chat session. An exemplary implementation of another communication process associated with industrial applications will now be discussed with respect to FIG. 4.

FIG. 4 is a block diagram that illustrates an operational scenario of computing system 400 in an exemplary implementation. In FIG. 4, two different view states are shown displayed on display system 401, labeled 405A and 405B. In view state 405A, computing system 400 executes an industrial application which generates graphical content in the form of GUI 409 for display on display system 401. In particular, GUI 409 is associated with an industrial application catalog that allows the user to view and select from new software releases and updates. Within the application catalog application, the user "Tom" has launched a chat session to inquire about a new human-machine interface (HMI) software release. When selecting the chat option from within the application catalog, the user could select the target users for the chat session, or the application could attempt to connect to the devices of any users within range of computing system 400 in some examples. Regardless of how the target users for the chat session are selected, computing system 400 engages in a chat session with at least one other mobile computing device using direct device-to-device communication. In this example, user "Joe" has responded to the request by providing a link to the new HMI software knowledge base. Tom then clicks the "Open Article" link that Joe provided in his chat response, which results in computing system 400 loading GUI 410 of the HMI software application knowledge base as shown in view state 405B.

View state 405B illustrates a different industrial application than the application catalog that was previously displayed on display system 401 of computing system 400 in view state 405A. In particular, view state 405B depicts computing system 400 executing an HMI software application which generates graphical content in the form of GUI 410 for display on display system 401. GUI 410 is associated with a knowledge base for the HMI software application, which provides documentation for the software and known issues. In this example, the "Documentation" tab is selected, which provides a Quick Start, User Guide, Troubleshooter, Product Profile, and Technical Data for the HMI software application. At the bottom of GUI 410, the user is provided with a chat feature within the HMI software application. The user can select the chat feature from within the application in order to discuss any questions or issues related to the HMI software application with other users of the application while remaining within the context of the application. An exemplary implementation of a chat session that includes industrial data within the session will now be discussed with respect to FIG. 5.

FIG. 5 is a block diagram that illustrates an operational scenario of computing system 500 in an exemplary implementation. Computing system 500 includes display system 501 which displays GUI 509 of an industrial application. In this example, the industrial application associated with GUI 509 comprises a network performance monitor application. Within the application, a chat session has been established between two users, Joe and Paul. The users are able to insert industrial data for display within the chat session. In some implementations, an industrial application may initially display industrial data and a chat session could be loaded alongside that data. In this example, Joe has included a trend diagram within the chat session that shows live data of the network performance in real time. Both Joe and Paul are able to view the live graph in real time within the chat session on their respective mobile computing devices, which provides the benefit of enabling these users to discuss the drop in network performance as it happens in real time. An exemplary implementation of a chat session that includes an industry-specific keyboard will now be discussed with respect to FIG. 6.

FIG. 6 is a block diagram that illustrates an operational scenario of computing system 600 in an exemplary implementation. Computing system 600 includes display system 601 which displays GUI 609 of an industrial application. In this example, a user is engaging in a chat session with another user from within the industrial application. An industry-specific keyboard is illustrated at the bottom of GUI 609, which provides the user with a library of industrial automation-specific images, fonts, and symbols for use in the chat session. In some implementations, the keyboard could be unique to the user, providing characters and symbols associated with the user's organizational role in an industrial automation environment. In at least one implementation, the keyboard for the chat session could be associated with the industrial application within which the chat session is occurring, thereby offering functions, symbols, and characters associated with that particular industrial application. In this manner, users are able to chat within the context of a particular industrial application, and have access to industry-specific characters, fonts, symbols, operators, and the like for use within the chat session.

Referring back to FIG. 1, computing systems 101 and 102 each separately comprise a processing system and communication transceiver. Computing systems 101 and 102 may also include other components such as a user interface, data storage system, and power supply. Computing systems 101 and 102 may each reside in a single device or may be distributed across multiple devices. Examples of computing systems 101 and 102 include mobile computing devices, such as cell phones, tablet computers, laptop computers, notebook computers, and gaming devices, as well as any other type of mobile computing devices and any combination or variation thereof. Examples of computing systems 101 and 102 also include desktop computers, server computers, and virtual machines, as well as any other type of computing system, variation, or combination thereof. In some implementations, computing systems 101 and 102 could comprise mobile devices capable of operating in a server-like fashion which, among other uses, could be utilized in a wireless mesh network.

Communication link 121 uses metal, air, space, optical fiber such as glass or plastic, or some other material as the transport medium—including combinations thereof. Communication link 121 could use various communication protocols, such as time-division multiplexing (TDM), Internet Protocol (IP), Ethernet, telephony, optical networking, wireless mesh networks (WMN), communication signaling, wireless protocols such as peer-to-peer networking over Bluetooth, Bluetooth low energy, Wi-Fi Direct, near field communication (NFC), or some other communication format, including combinations thereof.

Turning now to FIG. 7, a block diagram that illustrates an industrial automation environment 700 in an exemplary implementation is shown. Industrial automation environment 700 provides an example of an industrial automation environment that may be utilized to implement the communication processes disclosed herein, but other environments could also be used. Industrial automation environment 700 includes computing system 710, machine system 720, industrial controller 725, database system 730, and application integration platform 735. Machine system 720 and controller 725 are in communication over a communication link, controller 725 and database system 730 communicate over a communication link, database system 730 and application integration platform 735 communicate over a communication link, and application integration platform 735 and computing system 710 are in communication over a communication link. Note that there would typically be many more machine systems in most industrial automation environments, but the number of machine systems shown in FIG. 7 has been restricted for clarity.

Industrial automation environment 700 comprises an automobile manufacturing factory, food processing plant, oil drilling operation, microprocessor fabrication facility, or some other type of industrial enterprise. Machine system 720 could comprise a sensor, drive, pump, filter, drill, motor, robot, fabrication machinery, mill, printer, or any other industrial automation equipment, including their associated control systems. A control system comprises, for example, industrial controller 725, which could include automation controllers, programmable logic controllers (PLCs), programmable automation controllers (PACs), or any other controllers used in automation control. Additionally, machine system 720 could comprise other industrial equipment, such as a brew kettle in a brewery, a reserve of coal or other resources, or any other element that may reside in an industrial automation environment 700.

Machine system 720 continually produces operational data over time. The operational data indicates the current status of machine system 720, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 720 and/or controller 725 is capable of transferring the operational data over a communication link to database system 730, application integration platform 735, and computing system 710, typically via a communication network. Database system 730 could comprise a disk, tape, integrated circuit, server, or some other memory device. Database system 730 may reside in a single device or may be distributed among multiple memory devices.

Application integration platform 735 comprises a processing system and a communication transceiver. Application integration platform 735 may also include other components such as a router, server, data storage system, and power supply. Application integration platform 735 may reside in a single device or may be distributed across multiple devices. Application integration platform 735 may be a discrete system or may be integrated within other systems—including other systems within industrial automation environment 700. In some examples, application integration platform 735 could comprise a FactoryTalk® VantagePoint server system provided by Rockwell Automation, Inc.

The communication links over which data is exchanged between machine system 720, industrial controller 725, database system 730, application integration platform 735, and communication interface 708 of computing system 710 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 710 may be representative of any computing apparatus, system, or systems on which the display processes disclosed herein or variations thereof may be suitably implemented. Computing system 710 provides an example of a computing system that could be used as a either a server or a client device in some implementations, although such devices could have alternative configurations. Examples of computing system 710 include mobile computing devices, such as cell phones, tablet computers, laptop computers, notebook computers, and gaming devices, as well as any other type of mobile computing devices and any combination or variation thereof. Examples of computing system 710 also include desktop computers, server computers, and virtual machines, as well as any other type of computing system, variation, or combination thereof. In some implementations, computing system 710 could comprise a mobile device capable of operating in a server-like fashion which, among other uses, could be utilized in a wireless mesh network.

Computing system 710 includes processing system 701, storage system 703, software 705, communication interface 708, and user interface 709. Processing system 701 is operatively coupled with storage system 703, communication interface 708, and user interface 709. Processing system 701 loads and executes software 705 from storage system 703. Software 705 includes application 706 and operating system 707. Application 706 may include communication process 200 in some examples. When executed by computing system 710 in general, and processing system 701 in particular, software 705 directs computing system 710 to operate as described herein for communication process 200 or variations thereof. In this example, user interface 709 includes display system 711, which itself may be part of a touch screen that also accepts user inputs via touches on its surface. Computing system 710 may optionally include additional devices, features, or functionality not discussed here for purposes of brevity.

Turning now to FIG. 8, a block diagram is shown that illustrates computing system 800 in an exemplary implementation. Computing system 800 provides an example of computing systems 101, 300, 400, 500, 600, or any computing system that may be used to execute communication process 200 or variations thereof, although such systems could use alternative configurations. Computing system 800 includes processing system 801, storage system 803, software 805, communication interface 807, and user interface 809. User interface 809 comprises display system 808. Software 805 includes application 806 which itself includes communication process 200. Communication process 200 may optionally be implemented separately from application 806.

Computing system 800 may be representative of any computing apparatus, system, or systems on which application 806 and communication process 200 or variations thereof may be suitably implemented. Examples of computing system 800 include mobile computing devices, such as cell phones, tablet computers, laptop computers, notebook computers, and gaming devices, as well as any other type of mobile computing devices and any combination or variation thereof. Note that the features and functionality of computing system 800 may apply as well to desktop computers, server computers, and virtual machines, as well as any other type of computing system, variation, or combination thereof.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. When executed by computing system 800 in general, and processing system 801 in particular, software 805 directs computing system 800 to operate as described herein for communication process 200 or variations thereof. Computing system 800 may optionally include additional devices, features, or functionality not discussed herein for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable media or storage media readable by processing system 801 and capable of storing software 805. Storage system 803 may include volatile and nonvolatile, removable and non-removable media implemented in any method or technology for storage of information, such as computer readable instructions, data structures, program modules, or other data. Storage system 803 may be implemented as a single storage device but may also be implemented across multiple storage devices or sub-systems co-located or distributed relative to each other. Storage system 803 may comprise additional elements, such as a controller, capable of communicating with processing system 801. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 809, processing system 801 loads and executes portions of software 805, such as communication process 200, to render a graphical user interface for application 806 for display by display system 808 of user interface 809. Software 805 may be implemented in program instructions and among other functions may, when executed by computing system 800 in general or processing system 801 in particular, direct computing system 800 or processing system 801 to wirelessly connect to a remote computing system using a peer-to-peer protocol. Software 805 may further direct computing system 800 or processing system 801 to display a graphical user interface (GUI) associated with an industrial application on display system 808 of computing system 800. In addition, software 805 directs computing system 800 or processing system 801 to engage in a peer-to-peer communication session with the remote computing system, wherein the peer-to-peer communication session is displayed within the GUI of the industrial application. Finally, software 805 may direct computing system 800 or processing system 801 to display industrial data associated with the industrial application within the peer-to-peer communication session.

Software 805 may include additional processes, programs, or components, such as operating system software or other application software. Examples of operating systems include Windows®, iOS®, and Android®, as well as any other suitable operating system. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate communication between users in an industrial application as described herein for each implementation. For example, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-readable storage media are characterized as primary or secondary storage.

In some examples, if the computer-readable storage media are implemented as semiconductor-based memory, software 805 may transform the physical state of the semiconductor memory when the program is encoded therein. For example, software 805 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 800 is generally intended to represent a computing system with which software 805 is deployed and executed in order to implement application 806 and/or communication process 200 (and variations thereof). However, computing system 800 may also represent any computing system on which software 805 may be staged and from where software 805 may be distributed, transported, downloaded, or otherwise provided to yet another computing system for deployment and execution, or yet additional distribution. For example, computing system 800 could be configured to deploy software 805 over the internet to one or more client computing systems for execution thereon, such as in a cloud-based deployment scenario.

Communication interface 807 may include communication connections and devices that allow for communication between computing system 800 and other computing systems (not shown) or services, over a communication network 811 or collection of networks. In some implementations, communication interface 807 receives dynamic data 821 over communication network 811. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 809 may include a voice input device, a touch input device for receiving a gesture from a user, a motion input device for detecting non-touch gestures and other motions by a user, and other comparable input devices and associated processing elements capable of receiving user input from a user. Output devices such as display system 808, speakers, haptic devices, and other types of output devices may also be included in user interface 809. The aforementioned user input devices are well known in the art and need not be discussed at length here. User interface 809 may also include associated user interface software executable by processing system 801 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate communication between users in an industrial application associated with an industrial automation environment, wherein the program instructions, when executed by a computing system, direct the computing system to at least:
    display a graphical user interface (GUI) of the industrial application on a display system of the computing system operated by a first user in the industrial application, wherein the industrial application is configured to at least monitor industrial operations;
    via the industrial application, receive an indication of a second user in the industrial application with which to commence a communication session,
    via the industrial application, wirelessly connect to a remote computing system associated with the second user using a peer-to-peer protocol that facilitates direct device-to-device communication between the computing system and the remote computing system;
    via the industrial application, engage in a peer-to-peer communication session with the remote computing system using the peer-to-peer protocol,
        wherein the peer-to-peer communication session allows the first user and the second user to communicate, and
        wherein the peer-to-peer communication session is displayed within the GUI of the industrial application;
    via the industrial application, receive a selection of industrial data associated with the industrial application from the first user;
    display the industrial data indicated by the selection within the peer-to-peer communication session; and
    transfer the industrial data to the remote computing system using the peer-to-peer protocol for display within the peer-to-peer communication session on the remote computing system.

2. The one or more computer-readable storage media of claim 1 wherein the peer-to-peer communication session comprises a text-based chat session.

3. The one or more computer-readable storage media of claim 1 wherein the peer-to-peer communication session is launched from within an incident report associated with the industrial application.

4. The one or more computer-readable storage media of claim 1 wherein the computing system and the remote computing system engage in the peer-to-peer communication session using the peer-to-peer protocol without use of intermediate networking equipment.

5. The one or more computer-readable storage media of claim 1 wherein the industrial data associated with the industrial application comprises a live trend displaying current operational data as it is generated.

6. The one or more computer-readable storage media of claim 1 wherein the peer-to-peer communication session comprises a text-based chat session between the first user of the computing system and the second user of the remote computing system.

7. The one or more computer-readable storage media of claim 1 wherein the program instructions direct the computing system to display the industrial data includes operational data, machine data, screen graphics data, screen captures, video data, tag data, alarms, drive configurations, key performance indicators, charts, or trends.

8. A method of operating a computing system to facilitate communication between users in an industrial application associated with an industrial automation environment, the method comprising:
    displaying a graphical user interface (GUI) of the industrial application on a display system of the computing system operated by a first user in the industrial application, wherein the industrial application is configured to at least monitor industrial operations;
    via the industrial application, receiving an indication of a second user in the industrial application with which to commence a communication session;
    via the industrial application, wirelessly connecting to a remote computing system associated with the second user using a peer-to-peer protocol that facilitates direct device-to-device communication between the computing system and the remote computing system;
    via the industrial application, engaging in a peer-to-peer communication session with the remote computing system,
        wherein the peer-to-peer communication session allows the first user and the second user to communicate, and
        wherein the peer-to-peer communication session is displayed within the GUI of the industrial application;
    via the industrial application, receiving a selection of industrial data associated with the industrial application from the first user;
    displaying the industrial data associated with the industrial application within the peer-to-peer communication session; and
    transferring the industrial data to the remote computing system using the peer-to-peer protocol for display within the peer-to-peer communication session on the remote computing system.

9. The method of claim 8 further comprising displaying a user-specific keyboard within the peer-to-peer communication session having characters associated with a user's organization role in the industrial automation environment.

10. The method of claim 8 further comprising automatically presenting the industrial data on the GUI associated with the industrial application in response to an alarm to notify the first user of a potential problem.

11. The method of claim 8 wherein the computing system and the remote computing system engage in the peer-to-peer communication session using the peer-to-peer protocol without use of intermediate networking equipment.

12. The method of claim 8 wherein the industrial data associated with the industrial application comprises a live trend displaying current operational data as it is generated.

13. The method of claim 8 wherein the peer-to-peer communication session comprises a text-based chat session between the first user of the computing system and the second user of the remote computing system.

14. The method of claim 8 wherein displaying the industrial data associated with the industrial application within the peer-to-peer communication session comprises displaying the industrial data includes operational data, machine data, screen graphics data, screen captures, video data, tag data, alarms, drive configurations, key performance indicators, charts, or trends.

15. An apparatus to facilitate communication between users in an industrial application associated with an industrial automation environment, the apparatus comprising:
one or more computer-readable storage media; and
program instructions stored on the one or more computer-readable storage media that, when executed by a computing system, direct the computing system to at least:
display a graphical user interface (GUI) of the industrial application on a display system of the computing system operated by a first user in the industrial application, wherein the industrial application is configured to at least monitor industrial operations;
via the industrial application, receive an indication of a second user in the industrial application with which to commence a communication session;
via the industrial application, wirelessly connect to a remote computing system associated with the second user using a peer-to-peer protocol that facilitates direct device-to-device communication between the computing system and the remote computing system;
via the industrial application, engage in a peer-to-peer communication session with the remote computing system using the peer-to-peer protocol,
wherein the peer-to-peer communication session allows the first user and the second user to communicate in real-time using the peer-to-peer protocol, and
wherein the peer-to-peer communication session is displayed within a first view state of the GUI of the industrial application;
via the industrial application, receive a selection of industrial data associated with the industrial application from the first user;
display the industrial data associated with the industrial application within the peer-to-peer communication session presented within the first view state of the GUI; and
transfer the industrial data to the remote computing system using the peer-to-peer protocol for display within the peer-to-peer communication session on the remote computing system.

16. The apparatus of claim 15 wherein the program instructions, when executed by the computing system, further direct the computing system to display a user-specific keyboard within the peer-to-peer communication session having characters associated with a user's organization role in the industrial automation environment.

17. The apparatus of claim 15 wherein the program instructions stored on the one or more computer-readable storage media, when executed by the computing system, further direct the computing system to automatically present the industrial data on the GUI associated with the industrial application in response to an alarm to notify the first user of a potential problem.

18. The apparatus of claim 15 wherein the computing system and the remote computing system engage in the peer-to-peer communication session using the peer-to-peer protocol without use of intermediate networking equipment.

19. The apparatus of claim 15 wherein the industrial data associated with the industrial application comprises a live trend displaying current operational data as it is generated.

20. The apparatus of claim 15 wherein the peer-to-peer communication session comprises a text-based chat session between the first user of the computing system and the second user of the remote computing system.

* * * * *